(12) United States Patent
Jun et al.

(10) Patent No.: US 7,463,692 B2
(45) Date of Patent: Dec. 9, 2008

(54) DEVICE AND METHOD FOR SYMBOL CLOCK RECOVERY IN DIGITAL TELEVISION

(75) Inventors: Jung Sig Jun, Gyeonggi-do (KR); Tok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 10/927,149

(22) Filed: Aug. 27, 2004

(65) Prior Publication Data
US 2005/0069048 A1 Mar. 31, 2005

(30) Foreign Application Priority Data
Aug. 30, 2003 (KR) .................... 10-2003-0060557

(51) Int. Cl.
*H04L 5/12* (2006.01)
(52) U.S. Cl. .............. 375/261; 375/316; 375/321; 375/350; 375/340; 375/270; 348/325; 348/725; 348/726; 329/304; 329/306; 329/307; 329/308; 329/357
(58) Field of Classification Search ............ None
See application file for complete search history.

(56) References Cited

U.S. PATENT DOCUMENTS

| | | | | |
|---|---|---|---|---|
| 5,673,293 A * | 9/1997 | Scarpa et al. | ............... | 375/321 |
| 5,872,815 A * | 2/1999 | Strolle et al. | ................ | 375/321 |
| 6,052,423 A * | 4/2000 | Blois et al. | ................... | 375/355 |
| 6,160,443 A * | 12/2000 | Maalej et al. | ............... | 329/304 |
| 6,493,409 B1 * | 12/2002 | Lin et al. | .................... | 375/375 |
| 6,868,129 B2 * | 3/2005 | Li et al. | ...................... | 375/324 |
| 7,027,528 B2 * | 4/2006 | Liu et al. | .................... | 375/326 |
| 2001/0055349 A1* | 12/2001 | Kato et al. | .................. | 375/326 |
| 2003/0058967 A1* | 3/2003 | Lin et al. | .................... | 375/327 |

\* cited by examiner

*Primary Examiner*—Chieh M. Fan
*Assistant Examiner*—Siu M Lee
(74) *Attorney, Agent, or Firm*—Birch, Stewart, Kolasch & Birch, LLP

(57) ABSTRACT

A device and method for a symbol recovery in a digital television are disclosed. The device includes a symbol clock recovery device includes a remained phase error remover operating a digital baseband real/imaginary number component signals, and removing remained phase error, a timing error detector nonlinearly operating the real/imaginary number component signals having the remained phase error removed, and detecting symbol clock phase error information therefrom, and an oscillating part generating a symbol clock frequency compensated to at least two times from the detected symbol clock phase error information and outputting the compensated frequency.

19 Claims, 4 Drawing Sheets

DEVICE AND METHOD FOR SYMBOL CLOCK RECOVERY IN DIGITAL TELEVISION

CROSS-REFERENCE TO RELATED APPLICATIONS

This application claims the benefit of Korean Application No. P2003-060557, filed on Aug. 30, 2003, which is hereby incorporated by reference as if fully set forth herein.

BACKGROUND OF THE INVENTION

1. Field of the Invention

The present invention relates to a digital television, and more particularly, to a device and method for symbol clock recovery in a digital television. Although the present invention is suitable for a wide scope of applications, it is particularly suitable for enabling the symbol clock recovery to be more accurately performed.

2. Discussion of the Related Art

An advanced television systems committee (ATSC) 8 VSB (Vestigial Side Band) transmission system proposed by most current digital transmission systems and a US directed digital TV transmission mode loads data only in a transmission signal to increase an efficiency of a frequency. That is, clock information needed for data recovery at a receiving party is not transmitted. Therefore, the same clock as that employed during the transmission should be generated among the received signals to recover the data. A symbol clock recovery device performs the role.

FIG. 1 is a block diagram illustrating a general digital TV receiver having such symbol clock recovery. Referring to FIG. 1, if a radio frequency (RF) signal modulated in a VSB mode is received through an antenna 101, a tuner 102 selects a desired channel frequency. Then, the tuner 102 converts a VSB signal of an RF band to a first intermediate frequency (IF) band, and outputs to an analog processor 103. The analog processor 103 performs passband filtering and gain controlling to the first IF signal outputted from the tuner 102 for converting the first IF signal into a second IF signal, and outputs to an A/D (analog-to-digital) converter 104. The A/D converter 104 digitalizes the second IF signal and outputs the digitalized second IF signal to a phase splitter 105.

The phase splitter 105 splits (or separates) the digital signal into passband real/imaginary signals, the phases of which form an angle of −90°. The passband real/imaginary signals are then outputted to a carrier recovery 106. Hereinafter, the passband real signal will referred to as I, and the passband imaginary signal will be referred to as Q, which are both outputted from the phase splitter 105, for simplicity. The carrier recovery 106 converts I and Q passband signals to I and Q baseband signals, which are then outputted to a symbol clock recovery 107 for recovering the symbol clocks. Then, the data passed through the symbol clock recovery 107 are inputted to a channel equalizer 108.

The channel equalizer 108 removes linear noise existing on a transmission channel from the signal having the carrier recovered, and then outputs the signal to a phase tracker 109. However, the carrier recovery 106 cannot completely recover the phase of the carrier. Accordingly, in order to compensate the incomplete phase error, the output of channel equalizer 108 is passed through the phase tracker 109. The output of the phase tracker 109 is inputted to a forward error correction (FEC) unit 110, thereby correcting errors in digital codes received from a digital transmission through t channel decoder.

In other words, a transmitter such as a broadcast station selects an adequate method so as to transmit a transmission signal by channel encoding. Then, a receiver such as a digital television (TV) decodes the transmission signal, so as to correct the errors generated while passing though the channel. Herein, the forward error correction (FEC) unit 110 is the block carrying out the decoding process. The signal passing through the FEC unit 110 is inputted to an A/V signal processing unit 111. Then, the A/V signal processing unit 111 recovers audio and video signals compressed in MPEG-2 and Dolby AC-2 methods back to their initial forms.

However, as shown in FIG. 1, the symbol clock recovery 107 is located behind the carrier recovery 106. Thus, the symbol clock recovery 107 is influenced by the carrier recovery 106. Therefore, if the carrier recovery 106 is unable to recover a carrier frequency and phase due to multiple channel interference, the symbol clock recovery 107 is also unable to recover symbol clock. More specifically, in a structure having the carrier recovery and the symbol clock recovery sequentially connected to one another, the performance of the carrier recovery greatly influences the performance of the symbol clock recovery. In other words, in a structure whereby the carrier recovery and the symbol clock recovery are sequentially connected, the function and performance of the carrier recovery largely influence the function and performance of the symbol clock recovery. Thus, the symbol clock recovery is affected by the remained frequency and phase difference caused from the carrier recovery, thereby resulting in a deficient performance of the symbol clock recovery.

SUMMARY OF THE INVENTION

Accordingly, the present invention is directed to a device and method for symbol clock recovery in a digital television that substantially obviate one or more problems due to limitations and disadvantages of the related art.

An object of the present invention is to provide a device and method for symbol clock recovery in a digital television that can maintain the size of the frequency used in symbol clock recovery, thereby enabling the symbol clock recovery to be accurately performed even when the carrier frequency and phase are not recovered.

Another object of the present invention is to provide a device and method for symbol clock recovery in a digital television that use a nonlinear unit to completely remove remained phase error from a carrier recovery, thereby allowing the symbol clock recovery to be accurately performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a symbol clock recovery device includes a remained phase error remover operating a digital baseband real/imaginary number component signals, and removing remained phase error, a timing error detecting part nonlinearly operating the real/imaginary number component signals having the remained phase error removed, and detecting symbol clock phase error information therefrom, and an oscillating part generating a symbol clock frequency compensated to at least two times from the detected symbol clock phase error information and outputting the compensated frequency.

The remained phase error remover may include a first OQAM (Offset Quadrature Amplitude Modulation) converter converting the digital baseband real/imaginary number component signals to OQAM real/imaginary number component signals, respectively, a high-pass band filter filtering only high-pass band signal from the OQAM real/imaginary number component signals outputted from the first OQAM converter and removing information of a data section, and a square operator squaring each of the OQAM real/imaginary number component signals filtered and outputted from the high-pass band filter and adding and outputting the squared signals.

The timing error detecting part may include a gain controlling unit controlling a gain of the signal having the remained phase error removed, a filter filtering only frequency of a specific bandwidth required in a symbol clock recovery process from the signal having the gain controlled in the gain controlling unit, a phase splitter splitting the signal passing through the filter into the real/imaginary number component signals, and a timing error detector nonlinearly operating the real/imaginary number component signals outputted from the phase splitter, so as to generate symbol clock phase error information.

In addition, the gain controlling unit may include a gain controller controlling the gain of the signal having the remained phase error removed in accordance with an inputted direct current (DC) value, and a DC calculator determining an impulse size of the signal outputted from the gain controller and outputting the determined result as the DC value to the gain controller. And, the filter may transmit a $$\frac{\text{symbol frequency } (fs)}{2}$$

bandwidth required in a symbol clock recovery process from the signal having the gain controlled, so as to remove a direct current (DC) component included in the output signal of the gain controller.

Also, the timing error detector may include a second OQAM converter converting the real/imaginary number signals both split from the phase splitter to OQAM real/imaginary number signals, a nonlinear operator nonlinearly operating the OQAM real/imaginary number signals, and a subtracter calculating a difference value between the nonlinearly operated OQAM real/imaginary number signals in the nonlinear operator and generating a tone having the symbol clock phase error information on the $$\frac{\text{symbol frequency } (fs)}{2}$$

bandwidth. And, the oscillating part may include a loop filter filtering baseband signal components among the symbol clock phase error information outputted from timing error detector, and a numerically controlled oscillator (NCO) generating a symbol clock frequency newly compensated to at least two times in accordance with the baseband component of the filtered symbol clock phase error information.

In another aspect of the present invention, in a symbol clock recovery method in a digital television including an A/D converter converting an analog passband signal to a digital passband signal, and a carrier recovery converting the digital passband signal to a digital baseband signal, the method includes converting a digital baseband real/imaginary number component signals to an OQAM real/imaginary number component signals, respectively, high-pass band filtering the converted signals, and removing remained phase error by carrying out square operations and addition operations of the filtered signals, controlling a gain of the signals having the remained phase error removed, filtering only frequencies of a specific bandwidth required in a symbol clock recovery process from the signals having the gain controlled, splitting the filtered signals to real/imaginary number component signals, nonlinearly operating the split real/imaginary number component signals and generating symbol clock phase error information, and generating a symbol clock frequency at least two times a frequency compensated from the symbol clock phase error information and outputting the generated frequency.

Herein, the controlling a gain may control the gain of the signal having the remained phase error removed in accordance with an inputted direct current (DC) value, and allows a size of the signal having the remained phase error removed to be constant and uniform. And, the filtering frequencies may allow a $$\frac{\text{symbol frequency } (fs)}{2}$$

bandwidth required in a symbol clock recovery process from the signal having the gain controlled to be transmitted, and may remove a direct current (DC) component included in the signal having the gain controlled. Furthermore, the generating symbol clock phase error information may include converting the split real/imaginary number signals to OQAM real/imaginary number signals, nonlinearly operating each of the OQAM real/imaginary number signals, and calculating a difference value between the nonlinearly operated OQAM real/imaginary number signals in the nonlinear operator and generating a tone having the symbol clock phase error information on the $$\frac{\text{symbol frequency } (fs)}{2}$$

bandwidth.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
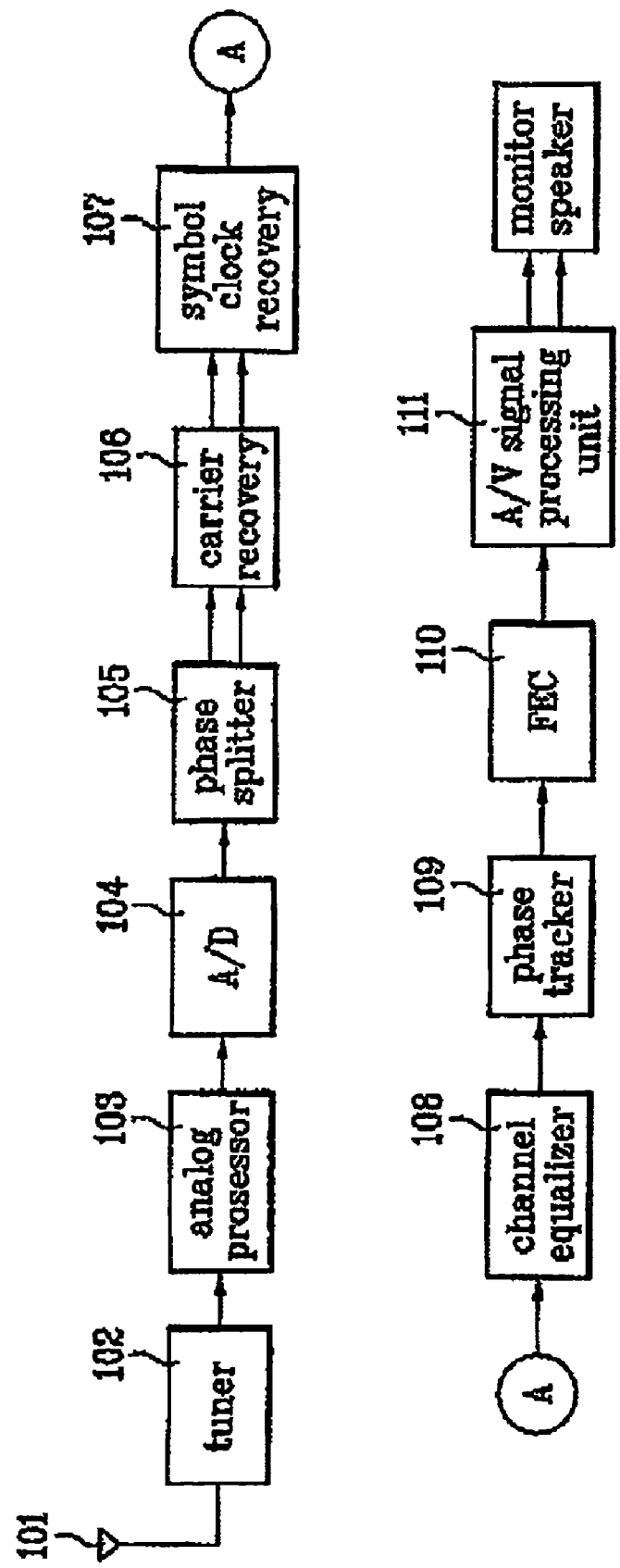
FIG. 1 illustrates a block diagram of a general digital television receiver.
Figure 2:
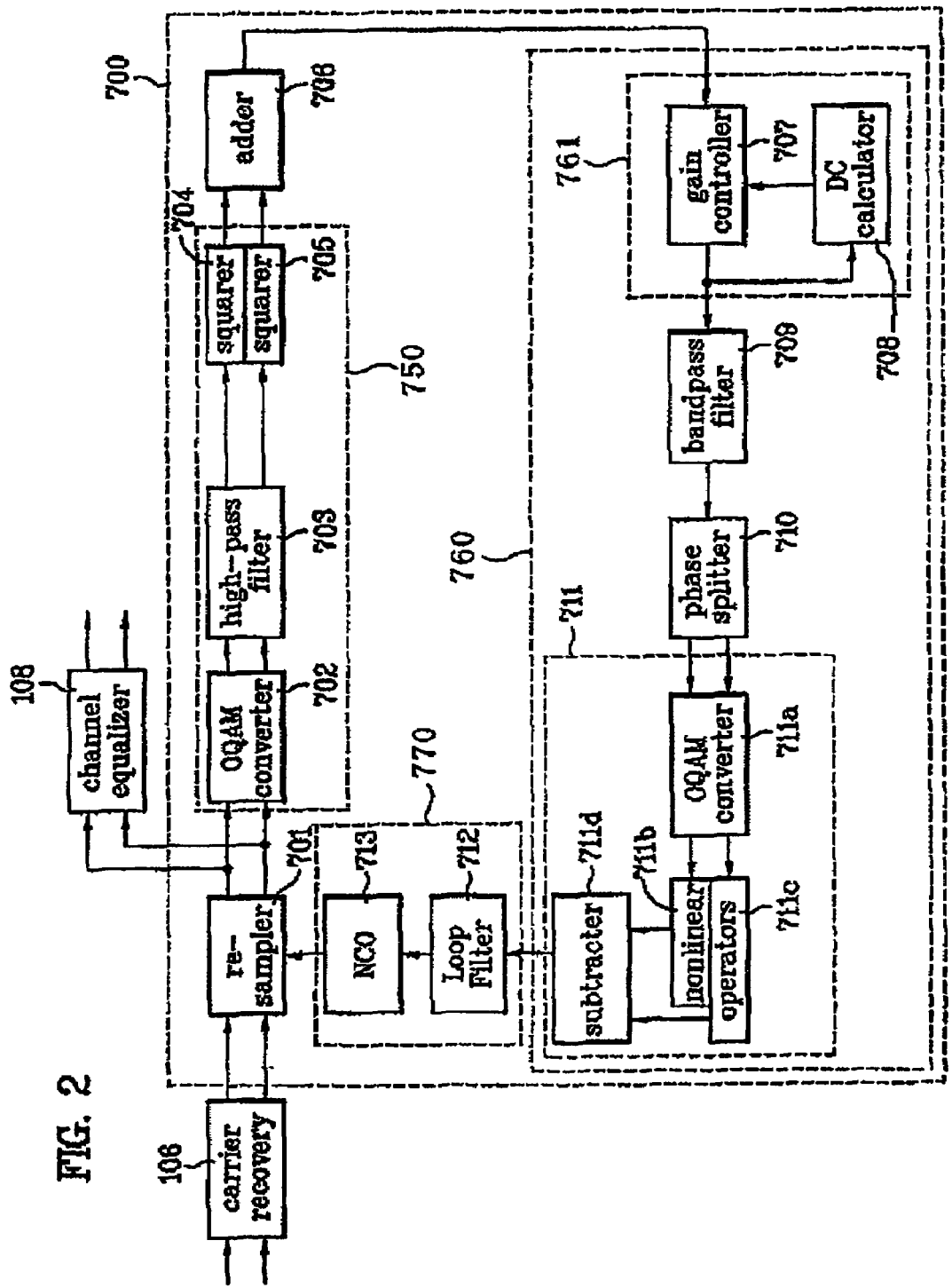
FIG. 2 illustrates a block diagram of a symbol clock recovery device according to an embodiment of the present invention.

FIG. 2 illustrates a block diagram of a symbol clock recovery device 700 according to the present invention. The symbol clock recovery device 700 includes a resampler 701 interpolating a digital baseband signal outputted from a carrier recovery 106 as digital signal synchronized with a symbol clock frequency two times, a first OQAM converter 702 converting VSB transmission type passband real/imaginary signals of outputted from the resampler 701 to Offset QAM (OQAM) transmission type passband real number signal I and passband imaginary number signal Q, a high-pass filter 703 high-pass filtering each of the OQAM type I and Q signals, a first squarer 704 squaring the OQAM type real number signal outputted from the high-pass filter 703, a second squarer 705 squaring the OQAM type imaginary number signal outputted from the high-pass filter 703, an adder 706 adding the squared values outputted from the first and second squarers 704 and 705, a gain controller 707 controlling the gain of an output signal of the adder 706 by using a size of an impulse signal existing in DC, a DC calculator 708 detecting the size of the impulse signal existing in the DC from the signal outputted from the gain controller 707 and feeding the detected size back to the gain controller 707, and a bandpass filter 709 transmitting only a specific frequency bandwidth of the signal outputted from the gain controller 707.

The symbol clock recovery device also includes a phase splitter 710 splitting output signals of the bandpass filter 709 into a real number signal I and an imaginary number signal Q, a timing error detector 711 detecting timing error information from I and Q signals, which are outputted from the phase splitter 710, a loop filter 712 filtering low frequency components from the timing error information outputted from the timing error detector 711, and a numerically controlled oscillator (NCO) 713 continuously deducing a symbol clock from a timing error value from the loop filter 712, calculating a time difference from a current A/D sample (i.e., data sampled to 25 megahertz (MHz)) and an actual symbol sample (i.e., data sampled to 21.52 megahertz (MHz)), modifying an output frequency in accordance with the calculated time difference value, and controlling a sampling timing of the resampler 701.

As shown in FIG. 2, the first OQAM converter 702, the high-pass filter 703, the first squarer 704 and the second squarer 705 make up a remained phase error remover 750. Further, the gain controlling unit 761, the bandpass filter 709, the phase splitter 710 and the timing error detector 711 make up a timing error detecting part 760. In addition, the gain controller 707 and the DC calculator 708 make up a gain controlling unit 761. Further, the loop filter 712 and the NCO 713 make up an oscillating part 770.

Referring to FIG. 2, the first OQAM converter 702, the high-pass filter 703, the first and second squarers 704 and 705, and the adder 706 will hereinafter be referred to as a remained phase error remover. The first squarer 704 and the second squarer 705, and the adder 706 will be referred to as a square operating unit. And, the gain controller 707 and the DC calculator 708 will be referred to as a gain controlling unit. Furthermore, the timing error detector 711 includes a second OQAM converter, first and second nonlinear operators 711b and 711c calculating nonlinear operations of the OQAM type I and Q signals, respectively, and a subtracter 711d calculating the timing error using outputs of first nonlinear operator 711b and the second nonlinear operator 711c.

The present invention having the above-described structure is an example of the A/D converter 104 sampling and digitalizing a second intermediate frequency (IF) signal to a fixed frequency oscillated from a fixed oscillator (i.e., the fixed frequency is different from a frequency of the symbol clock. It means an frequency clock used in A/D converter.) More specifically, data sampled to two times of the symbol clock frequency (fs) (i.e., 21.52 megahertz (MHz)) is transmitted from a transmitter. However, the data outputted from the A/D converter 104 is digitalized data sampled at fixed A/D clock frequency, thereby requiring the resampler 701.

In the resampler 701, the digital baseband signal outputted from the carrier recovery 106 is interpolated and outputted to two times of the symbol clock frequency (2 fs), i.e., a digital signal synchronized at 21.52 megahertz (MHz). Therefore, the data outputted from the A/D converter 104 is then sampled back to two times of the symbol clock frequency (i.e., 21.52 megahertz (MHz)) and outputted. When the A/D converter 104 samples data by using a variable frequency, the resampling process is not required, and instead, the output of the NCO 713 is outputted from the A/D converter 104.

The output of the resampler 701 is outputted to the channel equalizer 108 and the first OQAM converter 702. The first OQAM converter 702 multiplies a fixed oscillation frequency having a center frequency of 2.690559 megahertz (MHz) to the VSB I and Q signals resampled to 21.52 megahertz (MHz). Then, the first OQAM converter 702 converts the baseband VSB I and Q signals to OQAM I and Q signals and outputs the converted signals to the high-pass band filter 703. The high-pass band filter 703 removes information of data sections from the OQAM I and Q signals, which are then outputted to the first and second squarers 704 and 705. The first and second squarers 704 and 705 squares each of the OQAM I and Q signals, respectively, and then outputs the squared signals to the adder 706. The adder 706 then adds the squared OQAM I and Q signals, and the added value is outputted to the gain controller 707.

The phase error remaining after passing through the carrier recovery 106 is removed at the first squarer 704, the second squarer 705, and the adder 706. Accordingly, the output signal outputted from the adder 706 does not include any remained phase error component that remains from after passing through the carrier recovery 106. Therefore, even when the carrier is not fully recovered at the carrier recovery 106, the remained phase error is completely removed after passing through the first squarer 704, the second squarer 705, and the adder 706. Thus, it can been seen that the symbol clock recovery device 700 operates regardless of the remained phase error, thereby enabling a more stable symbol clock recovery to be performed.

Figure 3:
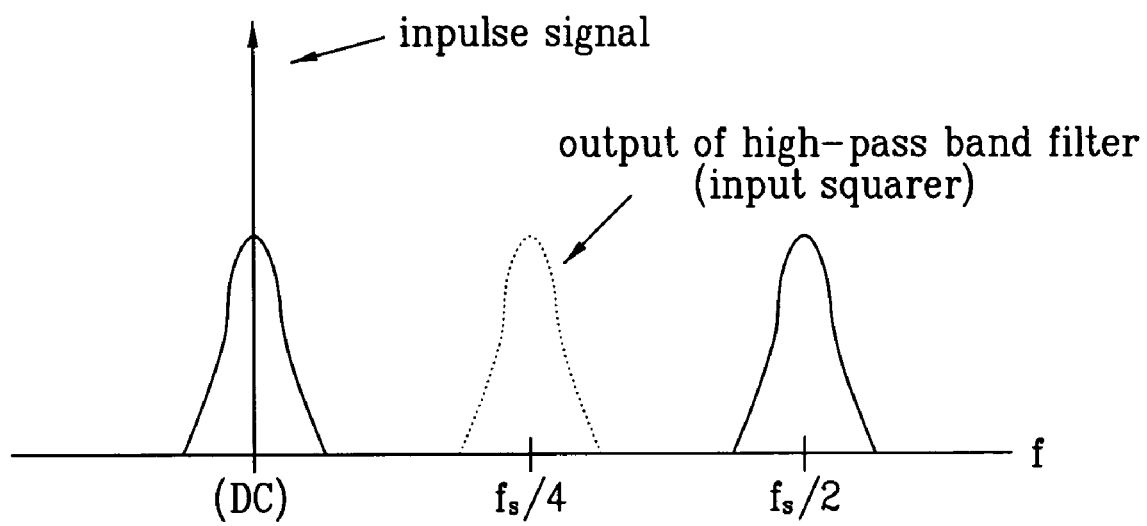
FIG. 3 illustrates an example of a frequency characteristic of a signal outputted from an adder of FIG. 2.

After passing through the high-pass band filter 703, the OQAM I and Q signals are squared at the first and second squarers 704 and 705, respectively, and then added at the adder 706, the characteristic of the output signal of the adder 706 is as shown in FIG. 3. More specifically, the output signal of the high-pass band filter 703 exists on a fs/4 frequency. When the output signal passes through the first squarer 704, the second squarer 705, and the adder 706, the signal bandwidth of the output signal is transmitted to a fs/2 frequency bandwidth, thereby generating a large impulse signal in a direct current (DC) 0. In other words, when the size of a signal near the fs/4 bandwidth is modified due to a multiple channel interference, the modified power is represented as a change of the DC value. The power of the impulse signal existing in the direct current (DC).

When the power of the output signal of the high-pass band filter 703 (shown in FIG. 2) is increased due to a ghost in a transmission channel, the magnitude of the impulse signal in the DC (shown in FIG. 3) is increased accordingly. Conversely, if the power of the output signal decreases, the magnitude of the impulse signal also becomes smaller. Therefore, the DC calculator 708 connected to an input terminal of the bandpass filter 709 uses such the above-described characteristic in order to determined the magnitude of the impulse signal being inputted to the bandpass filter 709. Then, the DC calculator 708 outputs the determined magnitude of the impulse signal, which is the DC value, to the gain controller 707.

The gain controller 707 controls the gain of the signal being inputted to the bandpass filter 709 based upon the change in the magnitude of the impulse signal (i.e., the DC value) calculated from the DC calculator 708, so as to allow signals having a constant and uniform power to be inputted to the bandpass filter 709. In other words, the gain controller 707 allows signals having a constant gain to be inputted to the bandpass filter 709. Accordingly, the first OQAM converter 702, the high-pass band filter 703, the first and second squarers 704 and 705, the adder 706, and the gain controller 707 can be described as signal processing units allowing the timing error detector to easily detect timing error in a PLL (phase lock loop) structure. At this point, if a Gardner timing error detector is used as the timing error detector, the entire function and performance of the symbol clock recovery device 700 can be influenced by the function and performance of the Gardner timing error detecting algorithm. Therefore, the present invention uses a timing error detector 711 using nonlinear operators, instead of the Gardner timing error detector, to detect timing error, so as to more stably perform a symbol clock recovery.

Figure 4:
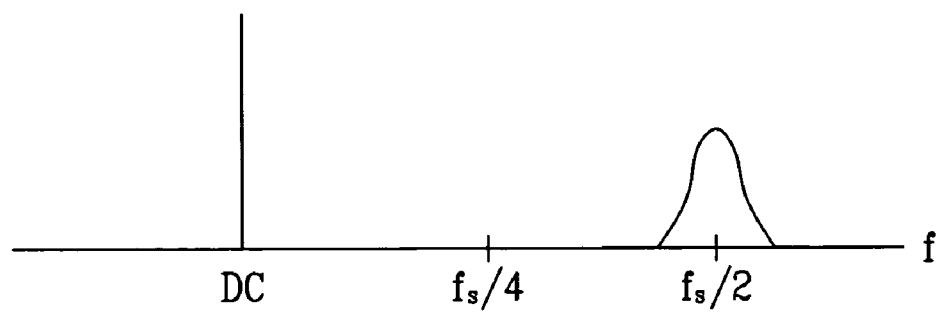
FIG. 4 illustrates an example of a frequency characteristic of a signal outputted from a bandpass filter of FIG. 2.

Meanwhile, the bandpass filter 709 transmits only signal having a specific frequency band, thereby DC component is removed from the output signal of the gain controller 707. More specifically, referring to FIG. 4, the bandpass filter 709 only transmits fs/2 signal bandwidth. The output of the bandpass filter 709 is outputted to the phase splitter 710 to be split into a real number component and an imaginary number component, which are then outputted to the second OQAM converter 711a of the timing error detector 711.

Figure 5:
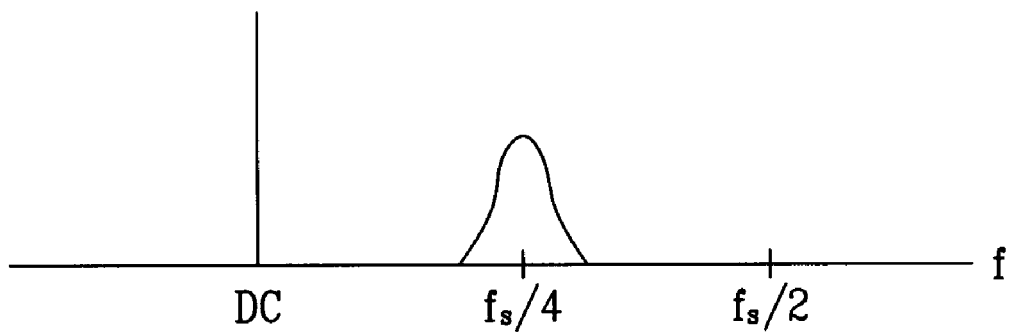
FIG. 5 illustrates an example of a frequency characteristic of a signal outputted from a second OQAM converter of FIG. 2.

Referring to FIG. 5, the second OQAM converter 711a multiplies a fixed oscillation frequency having a center frequency of 2.690559 megahertz (MHz) to the I and Q signals outputted from the phase splitter 710, which is similar to the first OQAM converter 702. Then, the multiplied I and Q signals are converted to OQAM I and Q signals and outputted to the first and second nonlinear operators 711b and 711c. More specifically, FIG. 5 shows a OQAM signal having a real number component, which is converted at the second OQAM converter 711a.

Herein, the first and second nonlinear operators 711b and 711c may use squarers (e.g., second power multipliers, fourth power multipliers, etc.), absolute value operators, and so on. An embodiment according to the present invention describes an example of using the first and second nonlinear operators 711b and 711c as the squarers. More specifically, when the output of the bandpass filter 709 passes through the first and second nonlinear operators 711b and 711c of the timing error detector 711, the bandwidth of the signal is increased to two times, thereby generating an alias with a neighboring sample. Accordingly, in order to reduce the bandwidth to a half, the signal is passed through the phase splitter 710 so as to be converted to OQAM I and Q signals at the second OQAM converter 711a of the timing error detector 711. In addition, the converted OQAM I and Q signals are each nonlinearly operated at the first and second nonlinear operators 711b and 711c, respectively.

Figure 6:
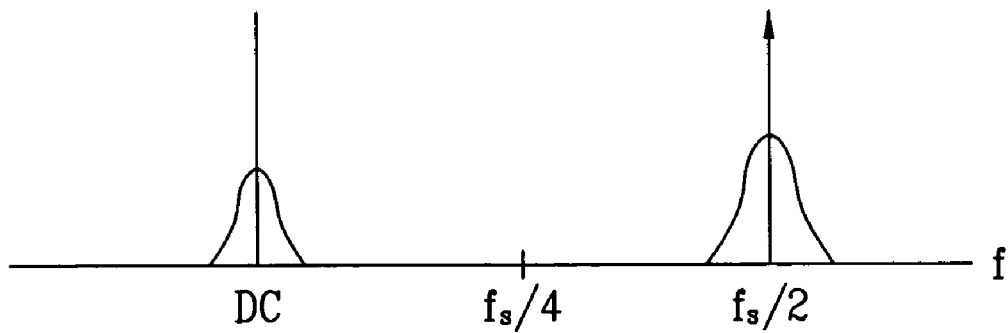
FIG. 6 illustrates an example of a tone having clock phase error information generated from a subtracter of FIG. 2.

The nonlinear operation values of the first and second nonlinear operators 711b and 711c are both outputted to the subtracter 711d. And, the subtracter 711d calculates a difference value between the two nonlinear operation values each outputted from the first and second nonlinear operators 711b and 711c, respectively, and outputs the calculated difference value to the loop filter 712. At this point, each of the first and second nonlinear operators 711b and 711c uses a squarer, and each of the OQAM I and Q signals is squared at the first and second nonlinear operators 711b and 711c, respectively. Then, a difference value between the squared OQAM I and Q signals is calculated from the subtracter 711d, thereby generating a tone having the clock phase error information required for symbol clock recovery in the fs/2 bandwidth, which is ½ of a symbol frequency; as shown in FIG. 6. In other words, the tone includes symbol frequency information required for carrying out symbol clock recovery, and information on a timing phase error in the received signal.

At this point, in order to use a timing error detector 711 using nonlinear operators along with the above-described signal processing performed in the first OQAM converter 702, the high-pass band filter 703, the first and second squarers 704 and 705, the adder 706, and the gain controller 707. The DC components generated while passing through the first and second squarers 704 and 705 should be removed. In the present invention, the information required for carrying out symbol clock recovery is extracted from the tone located at fs/2 frequency, as shown in FIG. 3. Therefore, in order to remove the DC components, the present invention uses the bandpass filter 709, which carried out the same role as the pre-filter used in the Gardner timing error detecting algorithm. At this point, by using the bandpass filter 709 instead of a DC remover, a roll-off characteristic of a signal edge component can be maintained. Meanwhile, the loop filter 712 passes only low frequency components among the timing error information detected from the timing error detector 711 using nonlinear operators and outputs the filtered signal components to the NCO 713. The NCO 713 generates a symbol clock frequency compensated to two times from the low-pass band frequency component of the timing error information, so as to control the sampling timing of the resampler 701.

As described above, using nonlinear operators as the timing error detector, the function and performance of the present invention is more excellent as compared to the Gardner algorithm, which only uses edge components of a signal spectrum. However, because the timing error detector using nonlinear operators uses a squarer, it has a disadvantage of a deficient jitter characteristic, as compared to the Gardner algorithm. The timing error detector using nonlinear operators is also disadvantageous in that when the size of a signal is decreased due to a multiple channel interference, the size of the generated tone also become smaller, thereby causing difficulty in the error detection. In order to resolve such problems, the present invention uses the first OQAM converter 702, the high-pass band filter 703, the first and second squarers 704 and 705, the adder 706, and the gain controller 707 in order to enhance the jitter characteristic. Also, by removing the DC using the bandpass filter 709, the roll-off characteristic of the band edge is maintained, thereby facilitating the generation of the tone required in the symbol clock recovery process. Also, by maintaining the tone at a constant size using the gain controller 707, the performance and function of the symbol clock recovery unit using nonlinear operators are enhanced even under conditions whereby multiple channel interference exists.

As aforementioned, the device and method for symbol clock recovery in a digital television according to the present invention have the following advantages. First, by using nonlinear operators as a timing error detector, the symbol clock can be stably recovered. Also, by forming a first OQAM converter, a high-pass band filter, squarers, and an adder at a front end of the timing error detector, other spectrum components that is not required in the required in symbol clock recovery process can be removed, thereby enhancing the jitter characteristic of the device. Finally, by using a gain controller and a direct current (DC) calculator, the size of a tone required in the symbol clock recovery process can be maintained at a constant size, thereby enhancing the function and performance of the symbol clock recovery device even under conditions in which multiple channel interference exists.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A symbol clock recovery device, comprising:
    a remained phase error remover configured to operate digital baseband real/imaginary number component signals, and to remove remained phase error;
    a timing error detecting part configured to operate as a nonlinear system the digital baseband real/imaginary number component signals having the remained phase error removed, and to detect symbol clock phase error information therefrom; wherein the timing error detecting part comprises:
        a gain controlling unit configured to control a gain of the signal having the remained phase error removed;
        a filter configured to filter only frequency of a specific bandwidth required in a symbol clock recovery process from the signal outputted from the gain controlling unit;
        a phase splitter configured to split the signal passing through the filter into the digital baseband real/imaginary number component signals; and
        a timing error detector configured to operate as a nonlinear system the digital baseband real/imaginary number component signals out-putted from the phase splitter, so as to generate symbol clock phase error information; and
    an oscillating part configured to generate a symbol clock frequency compensated to at least two times from the detected symbol clock phase error information and outputting the compensated symbol clock frequency.

2. The device according to claim 1, wherein the remained phase error remover comprises:
    a first OQAM (Offset Quadrature Amplitude Modulation) converter configured to convert the digital baseband real/imaginary number component signals to OQAM real/imaginary number component signals, respectively;
    a high-pass band filter configured to filter only the high-pass band signal from the OQAM real/imaginary number component signals outputted from the first OQAM converter and removing information of a data section; and
    an operator configured to square the OQAM real/imaginary number component signals filtered from the high-pass band filter and adding the squared signals.

3. The device according to claim 2, wherein the first OQAM converter multiplies a fixed oscillation frequency having a center frequency of 2.690559 megahertz (MHz) to the digital baseband real/imaginary number component signals, so as to convert the multiplied signals to the OQAM real/imaginary number component signals.

4. The device according to claim 1, wherein the gain controlling unit comprises:
    a gain controller configured to control the gain of the signal having the remained phase error removed in accordance with an inputted direct current (DC) value; and
    a DC calculator configured to determine an impulse size of the signal outputted from the gain controller and outputting the determined result as the DC value to the gain controller.

5. The device according to claim 1, wherein the filter transmits a $$\frac{\text{symbol frequency } (f_s)}{2}$$

bandwidth required in a symbol clock recovery process from the signal having the gain controlled, so as to remove a direct current (DC) component included in the output signal of the gain controller.

6. The device according to claim 1, wherein the timing error detector comprises:
    a second OQAM converter configured to convert the digital baseband real/imaginary number signals both split from the phase splitter to OQAM real/imaginary number signals;
    a nonlinear operator configured to operate as a nonlinear system the OQAM real/imaginary number signals; and
    a subtracter configured to calculate a difference value between the operated OQAM real/imaginary number signals in the nonlinear operator and generating a tone having the symbol clock phase error information on the $$\frac{\text{symbol frequency } (f_s)}{2}$$

bandwidth.

7. The device according to claim 6, wherein the second OQAM converter multiplies a fixed oscillation frequency having a center frequency of 2.690559 megahertz (MHz) to the digital baseband real/imaginary number component signals, so as to convert the multiplied signals to the OQAM real/imaginary number component signals.

8. The device according to claim 1, wherein the oscillating part comprises:
- a loop filter configured to filter baseband signal components among the symbol clock phase error information outputted from the timing error detecting part; and
- a numerically controlled oscillator (NCO) configured to generate a symbol clock frequency newly compensated to at least two times in accordance with the baseband component of the filtered symbol clock phase error information.

9. The device according to claim 1, further comprising a resampler resampling the digital baseband real/imaginary number component signals to two times the symbol clock frequency outputted from the oscillating unit and interpolating each of the resampled signals.

10. The device according to claim 9, wherein the resampler is located at an input terminal of the remained phase error remover.

11. In a symbol clock recovery method in a digital television including an A/D converter converting an analog passband signal to a digital passband signal, and a carrier recovery converting the digital passband signal to a digital baseband signal, the method comprising:
- converting a digital baseband real/imaginary number component signals to an OQAM real/imaginary number component signals, respectively, filtering only high-pass signal from the converted signals, and removing remained phase error by carrying out square operations and addition operations of the filtered signals;
- controlling a gain of the signals having the remained phase error removed;
- filtering only frequency of a specific bandwidth required in a symbol clock recovery process from the signals having the gain controlled;
- splitting the filtered signals to real/imaginary number component signals;
- operating non-linearly on the split real/imaginary number component signals and generating symbol clock phase error information; and
- generating a symbol clock frequency at least two times a frequency compensated from the symbol clock phase error information and outputting the generated symbol clock frequency.

12. The method according to claim 11, wherein the controlling a gain controls the gain of the signal having the remained phase error removed in accordance with an inputted direct current (DC) value, and allows a size of the signal having the remained phase error removed to be constant and uniform.

13. The method according to claim 12, wherein the DC value is decided by determining a size of an impulse of the signal having the gain controlled.

14. The method according to claim 11, wherein the filtering frequencies allows a $$\frac{\text{symbol frequency } (fs)}{2}$$

bandwidth required in a symbol clock recovery process from the signal having the gain controlled to be transmitted, and removes a direct current (DC) component included in the signal having the gain controlled.

15. The method according to claim 11, wherein the generating symbol clock phase error information comprises:
- converting the split real/imaginary number signals to OQAM real/imaginary number signals;
- operating nonlinearly on each of the OQAM real/imaginary number signals; and
- calculating a difference value between the operated OQAM real/imaginary number signals in the nonlinear operator and generating a tone having the symbol clock phase error information on the $$\frac{\text{symbol frequency } (fs)}{2}$$

bandwidth.

16. The method according to claim 15, wherein the converting the split real/imaginary number signals multiplies a fixed oscillation frequency having a center frequency of 2.690559 megahertz (MHz) to VSB (Vestigial Side Band) digital baseband real/imaginary number component signals, and converting the multiplied signals to the OQAM real/imaginary number component signals.

17. The method according to claim 11, wherein the generating a symbol clock frequency and outputting the generated frequency comprises:
- filtering only baseband signal components among the symbol clock phase error information outputted from timing error detector; and
- generating a symbol clock frequency newly compensated to at least two times in accordance with the baseband component of the filtered symbol clock phase error information.

18. The method according to claim 11, wherein when the A/D converter samples at least two times the symbol clock frequency of a VSB analog passband signal, the outputted at least two times the symbol clock frequency is inputted to the A/D converter.

19. The method according to claim 11, further comprising:
- resampling the VSB digital baseband real/imaginary signals to the at least two times the frequency of the symbol clock, when the A/D converter samples the VSB analog passband signal with a fixed frequency generated from a fixed oscillator and converts the sampled signal to a digital passband signal.

* * * * *